United States Patent [19]

Lee et al.

[11] Patent Number: 5,626,783

[45] Date of Patent: May 6, 1997

[54] TEMPERATURE COMPENSATION DEVICE AND METHOD FOR MAINTAINING WARMTH OF A COOKER UTILIZING AN INVERTER CIRCUIT

[75] Inventors: Chang W. Lee; Jong I. Park, both of Changwon, Rep. of Korea

[73] Assignee: Goldstar Co., Ltd., Seoul, Rep. of Korea

[21] Appl. No.: 307,883

[22] Filed: Sep. 16, 1994

[30] Foreign Application Priority Data

Sep. 17, 1993 [KR] Rep. of Korea ............... 93-19023

[51] Int. Cl.$^6$ ..................................................... H05B 1/02
[52] U.S. Cl. ........................ 219/497; 219/501; 219/483; 219/486; 219/508; 374/169; 374/133
[58] Field of Search ........................... 219/216, 483–486, 219/501, 497, 492, 505, 508, 509; 307/117; 374/169, 133, 172

[56] References Cited

U.S. PATENT DOCUMENTS

| | | | |
|---|---|---|---|
| 4,563,748 | 1/1986 | Hanaoka | 236/46 R |
| 4,717,924 | 1/1988 | Banga et al. | 219/482 |
| 4,755,780 | 7/1988 | Ito et al. | 333/234 |
| 5,352,865 | 10/1994 | Burkett et al. | 219/486 |
| 5,440,305 | 8/1995 | Signore et al. | 341/120 |

*Primary Examiner*—Mark H. Paschall
*Attorney, Agent, or Firm*—Helfgott & Karas, P.C.

[57] ABSTRACT

A device and a method for compensating for temperature fluctuations for maintaining the warmth of a cooker having an inverter circuit, which has a system controller which obtains a final compensation data by processing a temperature compensation data outputted from a compensation temperature selection section and a present temperature detected by a temperature detecting section. The system controller outputs a driving signal to drive a bottom heater, a top heater, and a side heater of the cooker according to a calculated final compensation data.

4 Claims, 4 Drawing Sheets

FIG. 3

| SW1 | SW2 | SW3 | SW4 | SW5 | SW6 | SW7 | SW8 | COMPEN-SATION DATA |
|-----|-----|-----|-----|-----|-----|-----|-----|------|
| ON  | ON  | ON  | ON  | ON  | ON  | ON  | ON  | 0°C  |
| ON  | ON  | ON  | ON  | OFF | OFF | OFF | OFF | -4°C |
| ON  | OFF | OFF | OFF | OFF | OFF | OFF | OFF | -7°C |
| OFF | OFF | OFF | OFF | OFF | OFF | OFF | OFF | +7°C |
| OFF | ON  | ON  | ON  | ON  | ON  | OFF | OFF | +2°C |
| OFF | ON  | ON  | ON  | OFF | OFF | OFF | OFF | +4°C |

FIG. 4

| SW1 | SW2 | SW3 | COMPEN-SATION DATA |
|-----|-----|-----|------|
| ON  | ON  | ON  | 0°C  |
| ON  | ON  | OFF | -2°C |
| ON  | OFF | ON  | -4°C |
| ON  | OFF | OFF | -6°C |
| OFF | ON  | ON  | 0°C  |
| OFF | ON  | OFF | +2°C |
| OFF | OFF | ON  | +4°C |
| OFF | OFF | OFF | +6°C |

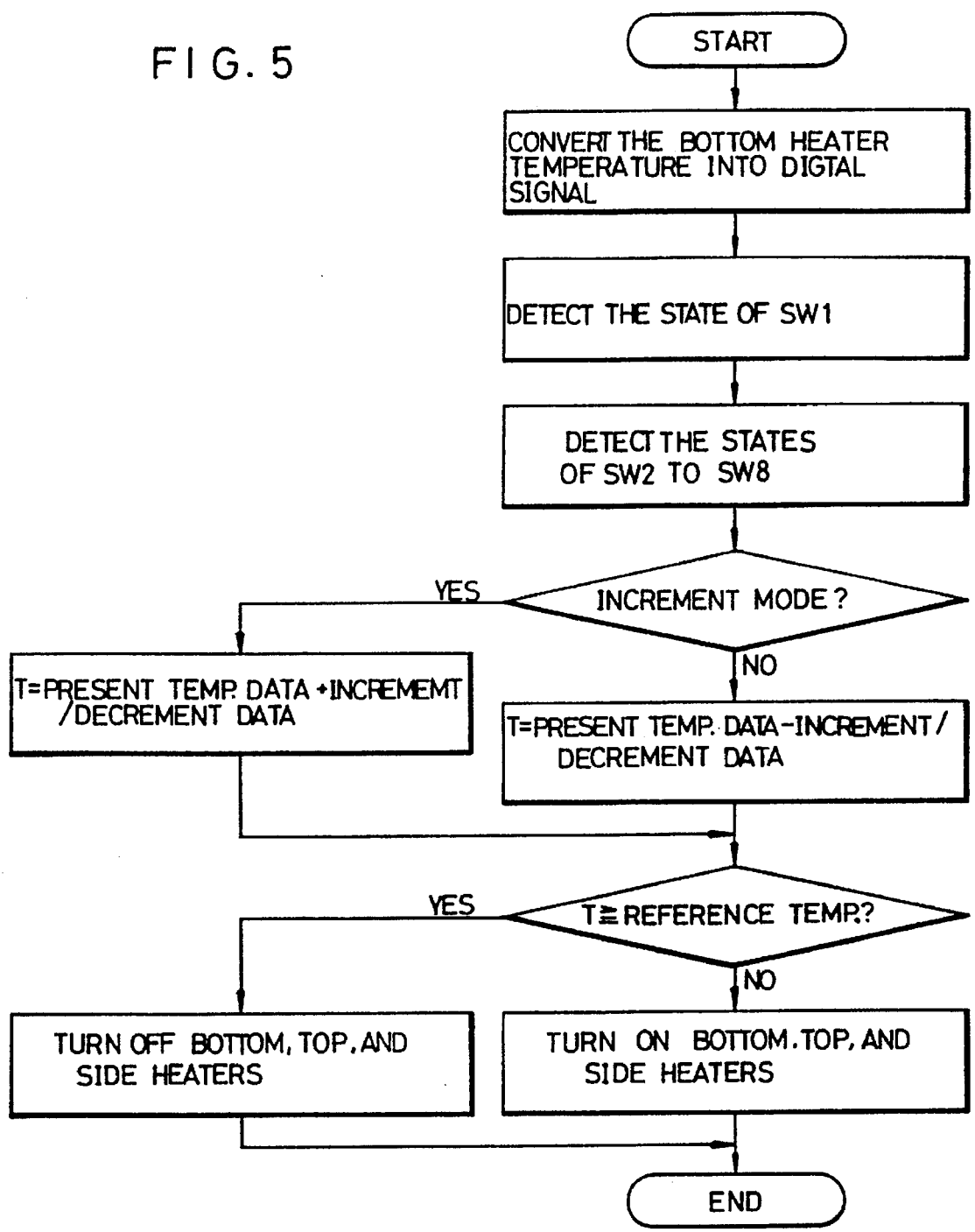

TEMPERATURE COMPENSATION DEVICE AND METHOD FOR MAINTAINING WARMTH OF A COOKER UTILIZING AN INVERTER CIRCUIT

BACKGROUND OF THE INVENTION

1. Field of the Invention

The present invention relates to a temperature compensation device and method for maintaining the warmth of an inverter cooker, and more particularly to a temperature compensation device and a method for maintaining the warmth of an inverter cooker which can preserve the optimum warmth temperature by precisely compensating for the warmth temperature deviation that each individual product is likely to have.

2. Description of the Prior Art

A conventional inverter cooker, when performing a 'cooking' function inputs,DC voltage rectified and smoothed from input AC source to an inverter switching section whose on/of timing is decided by pulse width modulation (hereinafter referred as PWM) signal. A bottom heater, as a working coil, heats food in a container with an eddy current created by electromagnetic induction effect that generated by resonance voltage because of 'on'/'off' operation of the inverter switching section. Meanwhile, when performing a 'maintaining warmth function', the inverter cooker detects the present temperature of the bottom heater, a side heater, and a top heater, and compares the present temperature with a reference temperature and thereafter maintains the warmth uniformly.

However, since the conventional inverter cooker maintains the warmth only by means of comparing the present temperature detected by a temperature detection device with the warmth temperature set in the factory, it cannot compensate properly for the variation of warmth temperature caused by temperature deviation every individual set has, or degradation of the temperature detecting section on due to long use. Therefore, the conventional inverter cooker has the problem of poor reliability in maintaining warmth.

SUMMARY OF THE INVENTION

It is an object of the present invention to provide a temperature compensation device and method for maintaining the warmth of an inverter cooker, which compensates properly for the variation of warmth temperature caused by temperature deviation every individual set has, or degradation of the temperature detecting section due to long use, and thereafter keeps the warmth uniformly.

According to one characteristic of the invention, in an inverter cooker provided with a bottom heater, a top heater, and a side heater, the present invention provides a temperature compensation device for keeping warmth of an inverter cooker, which comprises:

a temperature detecting means for detecting a present temperature;

a compensation temperature selection means for selecting a temperature compensation data in order to compensate said present temperature detected from said temperature detecting means; and a system controller means for controlling said bottom heater, said top heater, and said side heater according to a final compensation data calculated by comparing said temperature compensation data selected from said compensation temperature selection means with present temperature detected from said temperature detecting means.

According to another characteristic of the invention, the present invention provides a temperature compensation method for maintaining the warmth of an inverter cooker comprising the steps of:

detecting said present temperature;

selecting said temperature compensation data incrementally or decrementally in order to compensate said present temperature;

calculating said final compensation data from said present temperature and said temperature compensation data; and driving said bottom heater, said top heater, and said side heater according to said final compensation data calculated.

BRIEF DESCRIPTION OF THE DRAWINGS

The above object and other advantages of the present invention will become more apparent by describing the preferred embodiment of the present invention with reference to the attached drawings, in which:

FIG. 3 is a table showing a temperature compensation data selected at the compensation temperature selection section in FIG. 1.

FIG. 4 is a table showing a modified embodiment of the temperature compensation data selected at the compensation temperature selection section in FIG. 1.

FIG. 5 is an algorithm where a temperature compensation method for maintaining warmth according to the present invention is applied.

DETAILED DESCRIPTION OF THE PREFERRED EMBODIMENT

Figure 1:
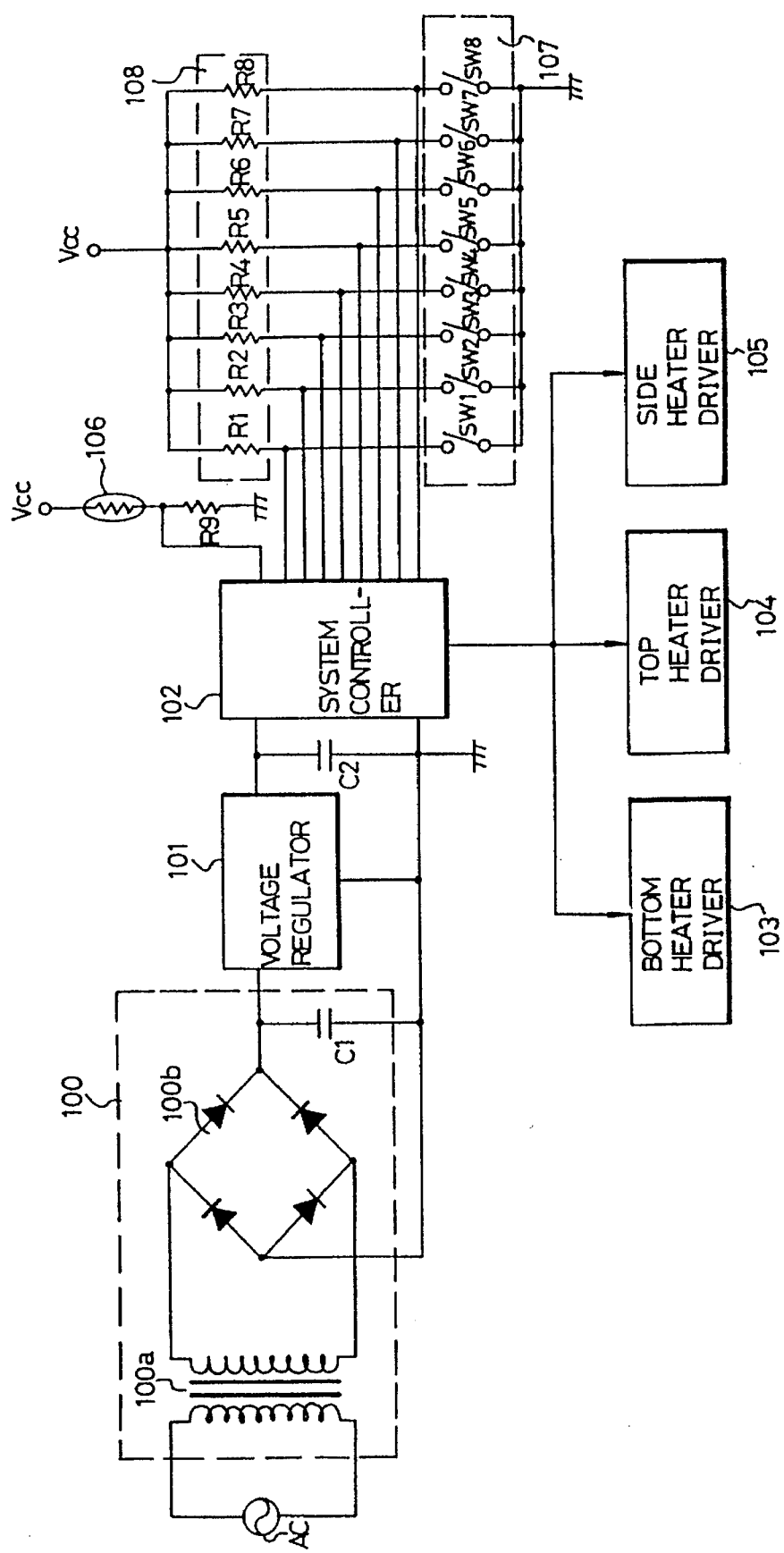
FIG. 1 is a block diagram of the present invention, a temperature compensation device and method for maintaining the warmth of an inverter cooker.

FIG. 1 is a block diagram of the present invention, a temperature compensation device and method for keeping warmth of an inverter cooker. With reference to FIG. 1, the present invention is provided with a rectifier 100 for rectifying and smoothing the AC voltage lowered by a transformer 100a with a bridge diode 100b and a capacitor C1; a voltage regulator 101 for regulating DC voltage rectified by the rectifier 100; a temperature detecting section 106 for detecting the present temperature in the inverter cooker, and outputting a corresponding signal; a compensation temperature selection section 107 which is composed of a first switch to an eighth switch SW1~SW8 for selecting a temperature increment/decrement mode data and a temperature compensation data in order to compensate the present temperature detected from the temperature detecting section 106; a system controller 102 for calculating a final compensation data by operating the temperature compensation data and the temperature increment/decrement mode data selected in the compensation temperature selection section 107 and the present temperature, and controlling the operation of the inverter cooker; pull-up resistors 108 for providing the system controller 102 with high/low logic according to the 'on'/'off' state of the first switch to the eighth switch SW1~SW8.

The present invention above-mentioned, a temperature compensation device for maintaining warmth is also provided with a bottom heater driver 103, a top heater driver 104, and a side heater driver 105 which drive a bottom heater, a top heater, and a side heater, not illustrated, respectively by the final compensation data according to the output of the system controller 102.

Figure 2:
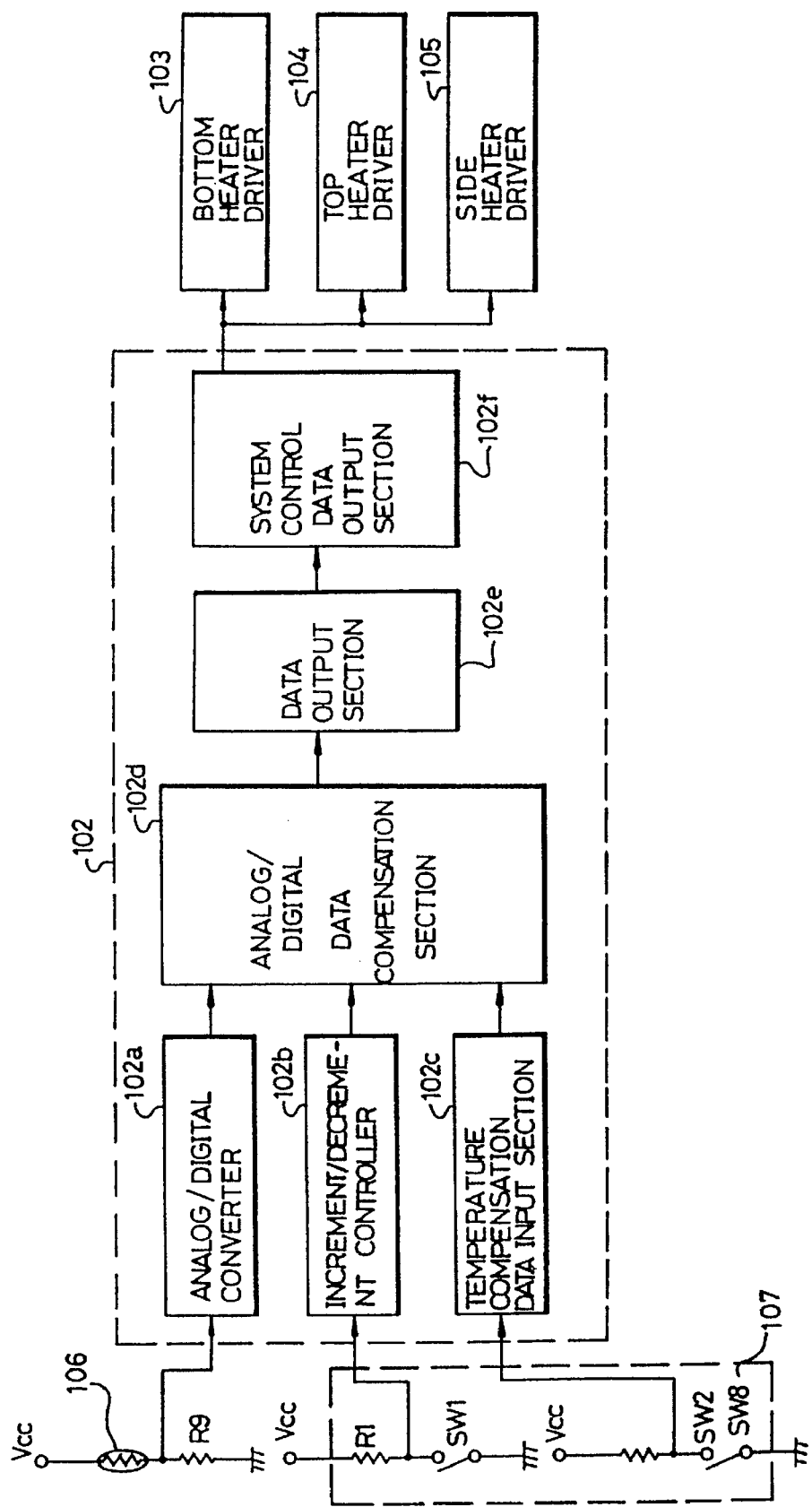
FIG. 2 is a block diagram of a system controller in FIG. 1.

Meanwhile, the system controller 102 is composed of, as is shown in FIG. 2, an analog/digital converter 102a for converting the present temperature detected from the temperature detecting section 106 into digital signal; an increment/decrement controller 102b for outputting temperature increment/decrement mode data according to the 'on'/'off' state of the first switch SW1 in the compensation temperature selection section 107; a temperature compensation data input section 102c for selecting temperature compensation data according to the 'on'/'off' state of the second switch to the eighth switch SW2–SW8 in the compensation temperature selection section 107; an analog/digital data compensation section 102d for operating the output data of the analog/digital converter 102a and the output, the temperature increment/decrement mode data, of the increment/decrement controller 102b and the output, the temperature compensation data, of the temperature compensation data input section 102c, and thereafter outputs final compensation data. The system controller 102 includes a data output section 102e and a system control data output section 102f which are connected with the output terminal of the analog/digital data compensation section 102.

The system control data output section 102f drives the bottom heater, the top heater, and the side heater according to the final compensation data outputted from the analog/digital data compensation section 102d.

The operation of the present invention, a temperature compensation device and method for maintaining the warmth of an inverter cooker as constructed above will be described in detail as follows.

First, an input AC source is lowered by the transformer 100a of the rectifier 100, and this lowered AC voltage is rectified and smoothed by the bridge diode 100b and the capacitor c1.

With reference to FIG. 2 and FIG. 5, the increment/decrement controller 102b of the system controller 102 selects the temperature increment/decrement mode data according to the 'on'/'off' state of the first switch SW1 of the compensation temperature selection section 107, for instance when the first switch SW1 is 'off', the increment/decrement controller 102b selects increment mode, when the first switch SW1 is 'on', the increment/decrement controller 102b selects decrement mode, and vice versa.

The temperature compensation data input device 102c selects the temperature compensation data for keeping warmth according to the 'on'/'off' state of the second switch to the eighth switch SW2–SW8 of the compensation temperature selection section 107. For example, in FIG. 3, when the second switch to the eighth switch SW2–SW8 are all 'on', the outputs of all switches go low by pull-up resistors R1–R8, and the temperature compensation data become 0° C. at this time. In the same way, when the first switch SW1 is 'off' and the second switch to the eighth switch SW2–SW8 are all 'off', the temperature compensation data become –7° C. And lastly when the first switch SW' is 'on' and the second switch to the eighth switch SW2–SW8 are all 'off', the temperature compensation data become –7° C.

The analog/digital data compensation section 102d synthesizes the outputs of the increment/decrement controller 102b, the compensation temperature data input section 102c and the output of the analog/digital converter 102a, and thereafter outputs the final compensation data to the data output section 102e and the system control data output section 102f. For example when the temperature outputted from the analog/digital converter 102a is 68° C., and the temperature input section 102c is 5° C., the final compensation data, outputted from the analog/digital data compensation section 102d, become 73° C.

The system control data output section 102f controls the bottom heater driver 103, the top heater driver 104, and the side heater driver 105 by means of the final compensation data as mentioned above. Therefore, food in the container is kept at optimum warmth. In the embodiment described above, the second switch to the eighth switch SW2–SW8 in the compensation temperature selection section 107 decides the amount of 1° C. compensation temperature per each switch.

FIG. 4 is a table showing modified embodiment of the temperature compensation data selected at the compensation temperature selection section 107. Referring to FIG. 4, the first switch SW1 is for selecting the temperature increment/decrement mode, and the second Switch SW2 and the third switch SW3 are for selecting the temperature compensation data. 2° C. of temperature compensation data would be selected by the 'on'/'off' state of the second switch SW2 and the third switch SW3.

As described above, the present invention can precisely compensate the warmth temperature deviation that is likely to vary with individual set. In addition, since the present invention can compensate the warmth temperature easily by selecting 107 in case of variation of the warmth temperature due to the variation of the set condition, the present invention can maintain the optimum warmth temperature, and accordingly, has the merit of improving the product's reliability.

What is claimed is:

1. A device for compensating for temperature deviations to maintain warmth of a cooker having an inverter circuit, a bottom heater, a top heater, and a side heater, the device comprising:

a temperature detecting means for detecting a present temperature;

a compensation temperature selection means for selecting temperature compensation data in order to compensate for deviations of said present temperature detected from said temperature detecting means; and a system controller, coupled to said temperature detecting means and said compensation temperature selection means, and also coupled to said bottom heater, top heater and side heater, for controlling said bottom heater, said top heater, and said side heater according to a final compensation data calculated by comparing said temperature compensation data selected from said compensation temperature selection means with the present temperature detected from said temperature detecting means.

2. A temperature compensation device as claimed in claim 1, wherein said system controller comprises:

an analog/digital converter for converting said present temperature detected from said temperature detecting means into a digital signal;

an increment/decrement controller for receiving said temperature compensation data and outputting a temperature increment mode or a temperature decrement mode data depending on said temperature compensation data selected in said compensation temperature selection means;

a temperature compensation data input means for processing a compensation data calculated according to said temperature compensation data selected in said compensation temperature selection means;

an analog/digital data compensation means for processing the output data of said analog/digital converter and said temperature increment or decrement mode data of said increment/decrement controller and an output of said temperature compensation data input means, and for outputting said final compensation data; and a system control data output means for outputting a signal for driving said bottom heater, said top heater, and said side heater according to said final compensation data outputted from said analog/digital data compensation means.

3. A temperature compensation device as claimed in claim 1, wherein said compensation temperature selection means comprises a plurality of switches for selecting said temperature increment/decrement mode data, and said temperature compensation data of definite range.

4. A method for compensation for temperature deviations in a cooker having an inverter circuit to maintain warmth of the cooker which has a bottom heater, a tope heater and a side heater, the method comprising the steps of:

detecting said present temperature;

selecting a temperature compensation data incrementally or decrementally in order to compensate for deviations of said present temperature;

calculating a final compensation data from said present temperature and said selected temperature compensation data; and driving said bottom heater, said top heater, and said side heater according to said final compensation data calculated.

\* \* \* \* \*